Oct. 26, 1937.  H. W. POOK  2,096,916

CONTROL OF RELAYS BY MEANS OF ELECTRICAL DISCHARGE TUBE CIRCUITS

Filed Jan. 9, 1935

INVENTOR
Harold Wilson Pook
BY
D. H. Blake
ATTORNEY

Patented Oct. 26, 1937

2,096,916

UNITED STATES PATENT OFFICE 2,096,916

CONTROL OF RELAYS BY MEANS OF ELECTRICAL DISCHARGE TUBE CIRCUITS

Harold Wilson Pook, Bromley, England, assignor to Radiovisor Parent Limited, London, England, a company of Great Britain Application January 9, 1935, Serial No. 1,073
In Great Britain January 11, 1934

4 Claims. (Cl. 250—41.5)

This invention relates to an electric circuit arrangement for operating a relay when a gas discharge tube associated with a condenser arcs or flashes when its arcing or flashing potential is reached and more particularly to an electric circuit arrangement whereby a relay is decisively actuated and controlled by a light sensitive cell or bridge, or a similar photo-electric device, without the use of means of magnification, although the light-sensitive element is only capable of passing a minute current, the value of which may be changing only slowly.

In this circuit the condenser is so arranged that the potential of the charge thereon is controlled by the resistance or relative resistance of the light sensitive element whilst the gas discharge tube and relay winding are arranged across the condenser so that when the latter reaches the potential at which the gas discharge tube arcs or flashes or becomes conductive the charge is passed through the winding of the relay and performs a switching operation.

According to the present invention a light sensitive cell or bridge, such as a photo-electric cell or a selenium bridge, is arranged in series with a resistance whereby the potential of the charge on the condenser is determined by the distribution of the potential across the cell or bridge and the resistance as a result of the action of light.

The necessary balance between the cell or bridge and the resistance may be obtained by including one or more additional resistances in parallel or in series with the cell or bridge or the resistance.

Figure 1:
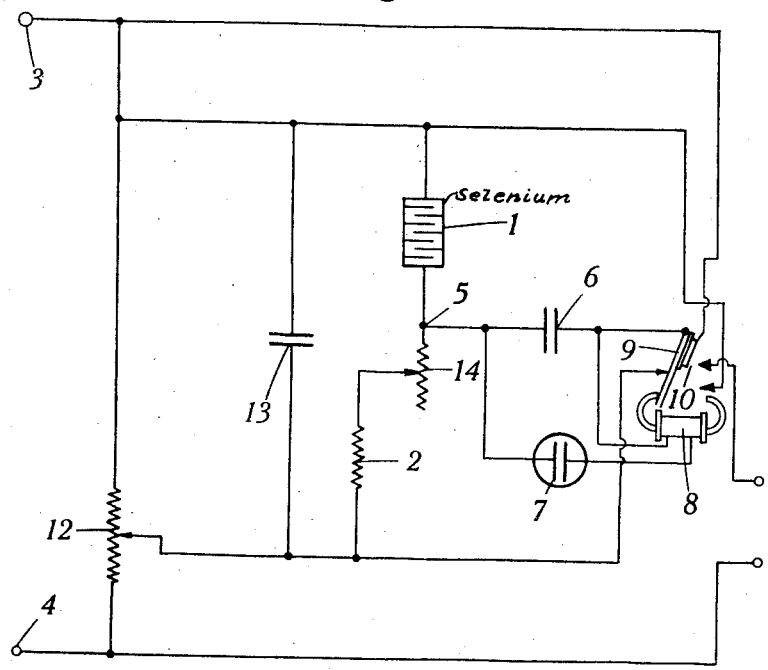
Figure 2:
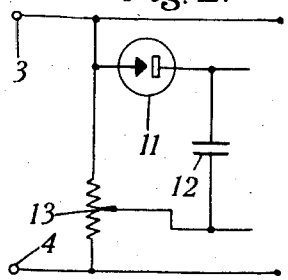

The invention will now be described with reference to the accompanying drawing wherein Fig. 1 shows a circuit diagram according to the invention and Fig. 2 shows a modification.

A light sensitive device 1, such as a selenium bridge or a photo-electric cell, and a fixed resistance 2 are arranged in series across a direct current supply circuit 3, 4. The junction point 5 between the light sensitive cell 1 and the resistance 2 (hereinafter referred to as a resistance system) is connected to one end of a circuit comprising a discharge condenser 6, shunted by a discharge tube 7, and a relay winding 8, which latter is adapted to control contacts 9 which serve to connect and disconnect the other end of the condenser 6 and its associated circuit alternately to and from opposite ends of the resistance system.

The relay is preferably of the polarized type so that it holds its armature in one position until the direction of the current through its winding is changed, when its armature is moved into a second position.

Assuming that the armature is in the position shown current flows into the condenser 6 and when the voltage across the condenser 6 and discharge tube 7 reaches the critical value, due to changes in the value of either of the resistances in the resistance system the condenser 6 discharges. The passage of current through the operative winding of the relay 8 is then reversed and the armature 9 moves to the second position so that the discharge condenser 6 and its associated circuit are disconnected from one extreme end of the resistance system and connected to the opposite extreme end of this system. Current now again flows into the condenser 6 and when the voltage across the condenser 6 and discharge tube 7 again reaches the critical value the condenser 6 again discharges. In this case, however, the direction of the current through the relay 8 is reversed so that the armature 9 is returned to the first position and the discharge circuit is connected across the first half of the resistance system.

It may be mentioned that the relay contacts or additional contacts such as 10 may be used to control one or more circuits in which are included other devices or relays.

The arrangement just described enables a single relay with a minimum of contacts to control a plurality of circuits or the operation of a number of devices included in separate circuits.

With slight modification the circuit just described may be utilized in connection with a source of supply of alternating current. For this purpose there is located between the mains and the arrangement according to the present invention, a suitable rectifier 11 such as a copper oxide rectifier or a thermionic tube as shown in Fig. 2.

The connection of the resistances 1, 2 to the supply circuit 3, 4 is such that the total voltage across these resistances is less than twice the discharge voltage of the discharge tube 7. Assuming that the gas discharge tube is a neon tube flashing at about 175 volts, then the voltage across the two resistances 1, 2 should preferably be below 350 volts, say 345 volts. Should the difference of potential between the supply mains 3, 4 be say 500 volts then for the purpose of the invention the resistances 1, 2 are connected to a suitable point of a resistance 12 across the mains 3, 4 in order to obtain the desired voltage. As will be readily understood the resistance of the light sensitive device 1 is adapted to vary according to changes in its illumination and consequently the changes in its resistance determine changes in potential at the junction point 5 and as a result the potential of the charge on the condenser 6 will be correspondingly increased or reduced. When the potential of the charge on the condenser 6 reaches the critical value at which the gas discharge tube 7 will flash or arc the condenser discharges until the potential falls to the value at which the discharge in the tube is extinguished.

Across the cell 1 and resistance 2 is preferably placed a smoothing condenser 13 having a suitable capacity according to the type of rectifier used.

A variable resistance 14 may also be arranged in series with the cell 1 and resistance 2 as shown.

What I claim is:

1. An electric circuit arrangement comprising a source of D. C. potential, a light sensitive cell and a fixed resistance arranged in series across said source of potential, a circuit including a gas discharge tube, and a relay winding arranged in series, and a condenser across said tube and said winding, the junction point between the tube and condenser being connected to the junction point between said cell and resistance, a movable contact connected to the junction point between said relay winding and said condenser, and two fixed contacts respectively connected to the ends of the cell and fixed resistance, said movable contact being normally in contact with one of said fixed contacts and being adapted to be brought into contact with the other fixed contact when said relay winding is energized.

2. A relay system comprising an input circuit, a light sensitive cell adapted to vary its resistance with variations of light intensity connected in series with a resistance across said circuit, a circuit including a gas discharge tube and relay winding in series shunted by a condenser, said circuit connected between the junction point of the light cell and resistance and a terminal of said input circuit, whereby changes of light intensity on said light sensitive cell will alter the potential distribution across said cell and resistance and hence the potential of the charge on said condenser.

3. A relay system comprising an input circuit, a light sensitive-cell adapted to vary its resistance with variations of light intensity connected in series, with a variable resistance and a fixed resistance across said circuit, a circuit including a gas discharge tube and relay winding in series shunted by a condenser, said circuit connected between the junction point of the light-sensitive cell and variable resistance and a terminal of said input circuit, whereby changes of light intensity on said light-sensitive cell will alter the potential distribution across said cell and resistances and hence the potential of the charge on said condenser.

4. A relay system according to claim 2 wherein a smoothing condenser is shunted across said cell and resistance.

HAROLD W. POOK.